March 24, 1970     W. H. JONES     3,502,899
LIQUID LEVEL AND ICE BANK CONTROL
Filed Feb. 6, 1968     2 Sheets-Sheet 1
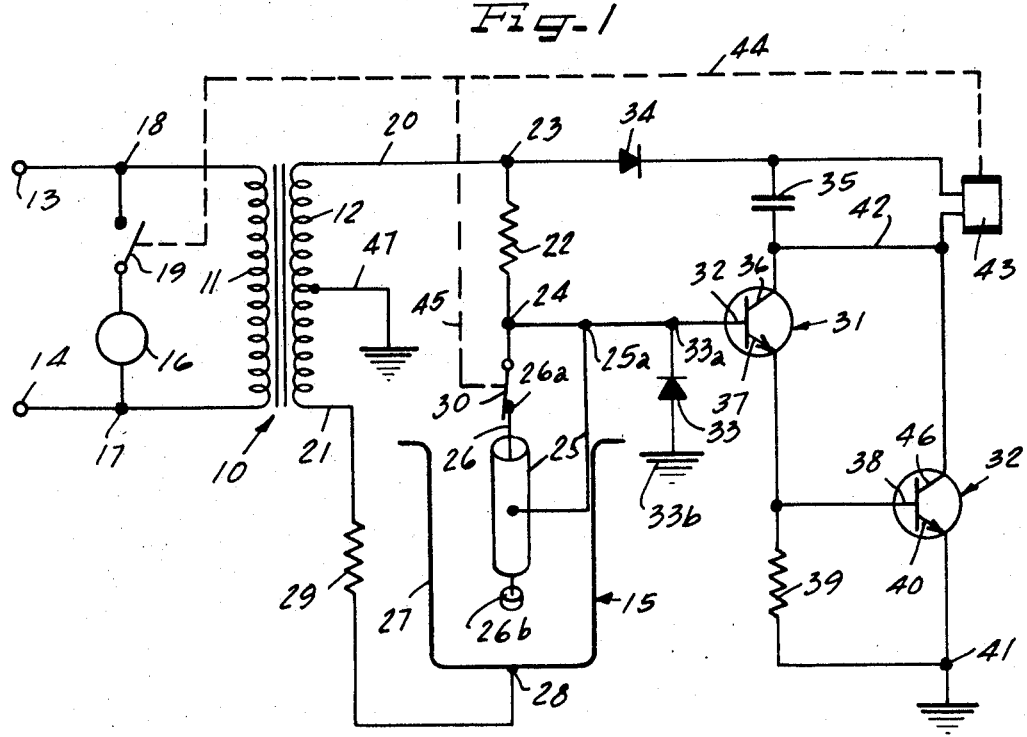
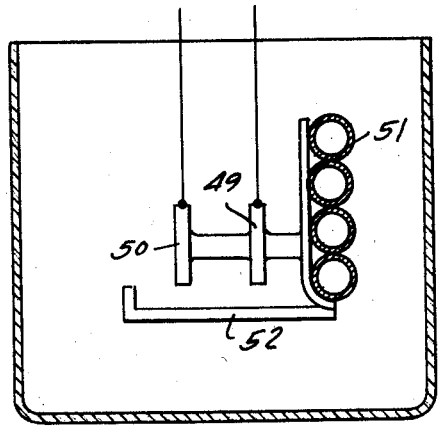
INVENTOR.
William H. Jones
BY     ATTORNEYS March 24, 1970 W. H. JONES 3,502,899
LIQUID LEVEL AND ICE BANK CONTROL
Filed Feb. 6, 1968 2 Sheets-Sheet 2
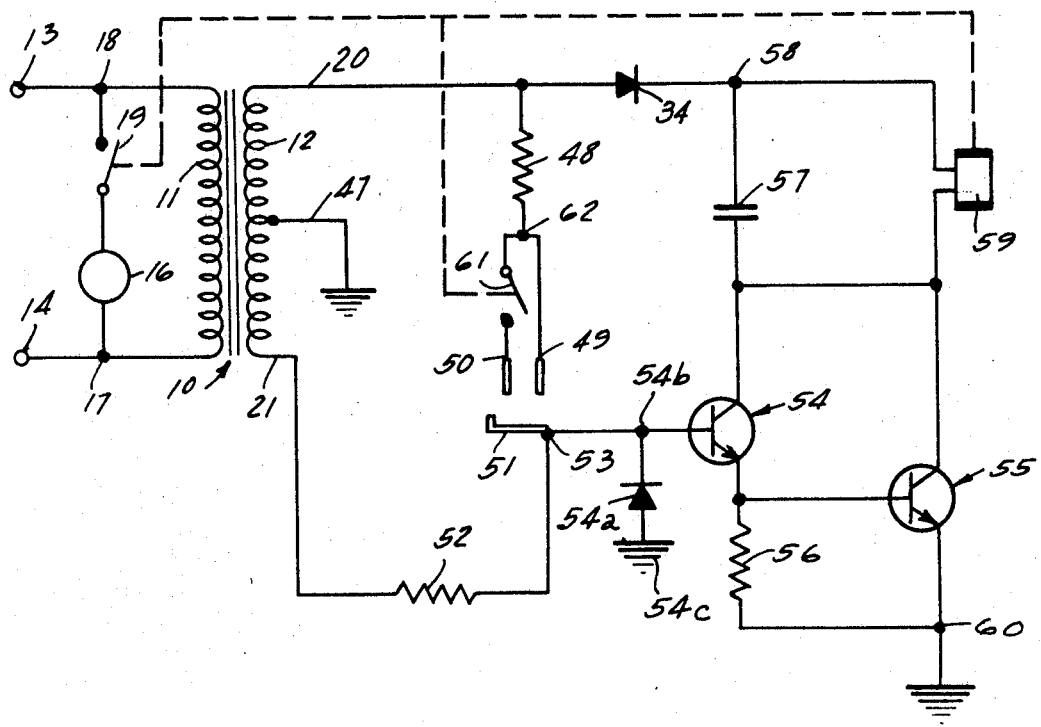
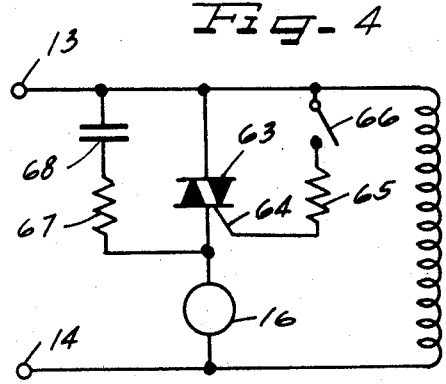
INVENTOR.
William H. Jones
ATTORNEYS

United States Patent Office 3,502,899
Patented Mar. 24, 1970

3,502,899
LIQUID LEVEL AND ICE BANK CONTROL
William H. Jones, Villa Park, Ill., assignor to The Dole Valve Company, Morton Grove, Ill., a corporation of Illinois
Filed Feb. 6, 1968, Ser. No. 703,466
Int. Cl. F25c 1/00
U.S. Cl. 307—118      1 Claim

ABSTRACT OF THE DISCLOSURE

A liquid level and ice bank control circuit having an input transformer and a series combination of a constant resistance and a variable load resistance coupled across the output of the transformer. An amplifier has an input which is coupled to a point in the series combination of resistors which is normally at substantially zero voltage level. Changes in the level of liquid within a container or changes in the ice bank cause changes in resistance in the variable resistor for increasing the voltage level of the amplifier input, thereby turning "on" the amplifier and activating a refill mechanism or deactivating a cooling device.

BACKGROUND OF THE INVENTION

Field of the invention

The field of art to which this invention pertains is electronic controls for regulating the level of fluid within a container or in the alternative for regulating the build-up of ice at an ice bank and, in particular, relates to an electronic circuit for utilizing the variable impedance developed between a probe and the walls of a container due to the variation in the liquid level therein or between two probes during the build-up of fluid or ice therebetween.

SUMMARY

It is an important feature of the present invention to provide an electronic circuit for regulating the level of fluid within a container or for regulating the degree of build-up of ice at an ice bank.

It is another feature of the present invention to provide an electronic control to regulate the level within a container or to regulate the build-up of ice at an ice bank wherein the effect of variations in line voltage is substantially zero.

It is an important object of the present invention to provide a circuit for controlling the level of liquid within a container and for regulating the build-up of ice at an ice bank wherein the control means takes the form of an amplifier and wherein the amplifier is coupled to the circuit to have a substantially zero normal input signal.

It is also an object of the present invention to provide a control circuit for effecting a change in the impedance of a variable impedance element which utilizes an AC signal to sense the magnitude of the impedance of the variable impedance element and which develops a response signal when the variable impedance element reaches a predetermined impedance level.

It is a further object of this invention to provide a circuit for controlling the impedance of a variable impedance element which includes a transformer having a secondary winding wherein a constant impedance element and a variable impedance element are connected in series across the secondary of the winding and wherein an amplifier means is connected to a normally zero voltage level in said series impedance combination.

It is an additional object of the present invention to provide a circuit as described above wherein the transformer secondary winding has a circuit grounded center tap and wherein an AC signal is developed across said secondary with respect to the center tap and applied across the series combination of constant impedance and variable impedance elements and wherein the constant impedance element is proportioned relative to the normal impedance of the variable impedance element to give a substantially zero output voltage at the point of coupling of an output sensor amplifier.

These and other objects, features and advantages of the present invention will be understood in greater detail from the following description and the accompanying drawings wherein reference numerals are utilized to designate an illustrative embodiment.

BRIEF DESCRIPTION OF THE DRAWINGS

FIGURE 1 is a schematic of an electronic control circuit for regulating the level of liquid within a container by continually monitoring the impedance of a variable impedance element associated with the level of fluid within the indicated container;

FIGURE 2 is a schematic having similarities with respect to FIGURE 1 and specifically showing an electronic circuit for controlling the build-up of ice at an ice bank and specifically showing a circuit for responding to a change in impedance between two probes due to the build-up of cold water or ice therebetween;

FIGURE 3 is a sectional view of a container which may be utilized with the circuit of FIGURE 2 for sensing the build-up of cold water or ice between the indicated probes therein, and FIGURE 4 is an alternate input switching means for responding to the output control signal to either activate or deactivate a device being controlled.

DESCRIPTION OF THE PREFERRED EMBODIMENT

An electronic control system in accordance with the present invention is shown in FIGURE 1 as including a transformer 10 having a primary winding 11 and a secondary winding 12. A standard 115 voltage source may be connected between a pair of input terminals 13 and 14 to supply the primary winding 11.

Generally, the circuit shown in FIGURE 1 is used to regulate the level of fluid within a container 15. A pump or similar device 16 is coupled between a pair of terminals 17 and 18 which are identical to the input terminals 13 and 14 of the primary winding 11. A switch 19 may be opened or closed to energize or de-energize the pump or similar device 16 from the input power line. Accordingly, by controlling the switch 19, the level of fluid within the container 15 may be regulated.

The secondary winding 12 has a pair of output terminals 20 and 21 to which are connected a series of impedances. In particular, a resistor 22 is coupled from a circuit junction point 23 to a circuit junction point 24. A second impedance is the variable impedance element which includes a first probe 25 which is connected from a junction point 25a through a container 27 to a further junction point 28. A second probe 26 is coupled from a circuit junction point 26a to a point 26b and hence to the point 28 through the container 27. A still further impedance includes a resistor 29 which is coupled from the circuit junction point 28 to the terminal 21 of the secondary winding 12.

A switch 30 is coupled between the circuit junction points 24 and 26.

A compound amplifier which includes a first transistor 31 and a second transistor 32 is coupled to the circuit point 24. A diode 33 is coupled from a circuit point 33a to ground at 33b. A further diode 34 is coupled from the circuit junction point 23 through a filter capacitor 35 to the collector 36 of the transistor 31. The diodes 33 and 34 prevent the application of a reverse signal on the transistor input.

The emitter 37 of the transistor 31 is coupled to a base 38 of the transistor 32. Bias for the transistor 32 is established by means of a resistor 39 which is coupled from the base 38 to the emitter 40 of the transistor. The emitter 40 is grounded at a circuit junction point 41.

The collectors of the transistors 31 and 32 are tied together by means of a short 42. A solenoid 43 which is associated with a relay mechanism for operating the switches 30 and 19 as indicated by the dotted lines 44 and 45 is coupled from the cathode of the diode 34 to the collector 46 of the transistor 32. Energization of the coil 43 then would cause the opening of the switch 30 and the closing of the switch 19 from their indicated positions.

The secondary winding 12 of the input transformer 10 is grounded at a center tap 47. Hence the center tap of the transformer 10 is coupled to the circuit ground point 41 at the emitter 40 of the transistor 32.

In operation, the impedance 22 may be in the order of 15K ohms, and the impedance 29 may be in the order of 3.3K ohms. Also, the normal impedance between the probe 25 or the probe 26 and the container 15 may be in the order of 10 to 15K ohms.

Accordingly, when the terminal 20 of the transformer 10 is positive, for instance, the voltage at the junction point 24 will be substantially zero, and therefore the transistor 31 will be held in an "off" condition. This is also true when the terminal 21 of the transformer 10 is positive. Due to the substantially zero voltage level at the junction point 24, variations in line voltage will have substantially zero effect on the calibration of the system.

As the level of fluid within the container 15 decreases, the impedance between the probe 26 and the container 15 substantially increases, thereby developing a voltage rise at the junction point 24 for turning "on" the transistor 31. The turning "on" of the transistor 31, in turn, turns "on" the transistor 32, thereby energizing the relay winding 43 and closing the switch 19 and opening the switch 30. The opening of the switch 30 takes the probe 26 out of the circuit. Therefor as water rises in the tank 15, the voltage at the point 24 will not be reduced until the water level rises to the point at which the impedance between the probe 25 and the tank 15 is reduced. When this occurs, the relay 43 is deactuated and the pump 16 stops adding water to the tank 15. Also the switch 30 is closed. The closing of the switch 30 requires the water level to fall until there is an impedance increase between the probe 26 and the tank 15. In this way, the "on" level is measurably below the "off" level of the pump 16.

While the circuit of FIGURE 1 is specifically designed to regulate the level of liquid within the container 15, the circuit shown in FIGURE 2 is likewise designed to control the ice build-up at an ice bank.

The circuit of FIGURE 2 has a similar input network and transformer, and, accordingly, reference numerals have been carried from FIGURE 1 to identify like elements.

In the circuit of FIGURE 2, the first in the series of impedances which are coupled across the transformer secondary 12 is a resistor 48 which may be in the order of 3.3K ohms. A pair of probes 49 and 50 are connected adjacent to an additional probe 51 which in turn is connected to a further resistor 52. The resistor 52 which is coupled to the terminal 21 of the winding 12 may be in the order of 51K ohms.

The resistance between the probe 49 or 50 and the probe 51 may be in the order of 50K ohms. Accordingly, under normal circumstances, the voltage level at a circuit junction point 53 is substantially zero, and hence an amplifier which includes a transistor 54 and a second transistor 55 will be maintained in an "off" state. The transistors 54 and 55 are connected similarly to the transistors 31 and 32 shown in FIGURE 1. A diode 54a is coupled between point 54b and point 54c similar to the diode 33 of FIGURE 1. In particular, a resistance 56 is coupled from the base to emitter of the transistor 55 to establish the bias thereof, and the emitter of the transisor 54 is coupled to the base of the transistor 55. Also, a filter capacitor 57 is coupled from a circuit junction point 58 to the collector of the transistor 54. A solenoid winding 59 is coupled from the junction point 58 to the collector of the transistor 55. The emitter of the transistor 55 is grounded as at 60 thereby completing the circuit between the transformer center tap 47 and the emitter of the transistor 55.

In operation, the compressor 16 may be started by actuating the solenoid 59 and closing the switches 19 and 61 thereby. As the level of ice builds up at the ice bank from probe 49 to the probe 50, the impedance increases over the impedance of water thereby developing a drop in voltage at the base of the transistor 54 for turning "off" the same and hence turning "off" the transistor 55 and de-energizing the relay winding 59. De-energization of the winding 59 opens the switches 19 and 61. As the level of ice decreases at the ice bank, the impedance between the probes 49 and 51 decreases thereby causing a rise in voltage at the base of the transistor 54 and, accordingly, turning "on" the relay 58.

FIGURE 3 illustrates a typical form which the probes 49 and 50 may take. In particular, the probes 49 and 50 may be coupled together adjacent to a set of cooling coils 51 such that the build-up of ice from right to left will increase the impedance between the probes 49 or 50 and the probe 52 thereby causing the de-energization of the control circuit as shown in FIGURE 2.

FIGURE 4 shows an alternate supply source for controlling the input signal to the transformer 10 in either of the circuits of FIGURES 1 and 2. In particular, a solid state device 63 having a gate 64 and a series connected resistor 65 is controlled by means of a switch 66 which in turn is operated by a relay 43 or 59 depending upon the circuit to which it is coupled. The closing of the switch 66 triggers the device 63. The device 63 passes AC current and hence energizes the pump or compressor 16. A filter consisting of a resistor 67 and a capacitor 68 is connected across the device 63. By using such a control circuit as shown in FIGURE 4, a much smaller voltage is switched at the switch 66 than would be switched by means of direct relay control of the device 16 such as by the switch 19.

It will be apparent that modifications and combinations of the features of my invention as set forth herein may be accomplished by those skilled in the art, but I desire to claim all such modifications and combinations as properly come within the spirit and scope of my invention.

I claim:

1. A circuit for controlling the energization of a prime mover of a refrigerating system in response to changes in circuit impedance in accordance with environmental conditions, comprising first means for coupling the prime mover to an alternating current energy supply source including:

first switch contacts disposed between the prime mover and the source, a solid state device connected to the source having a gate electrode connectable to the source via said first switch contacts, and a filter circuit connected across said solid state device, an impedance device which exhibits an impedance of varying value in accordance with a changing temperature, second coupling means for coupling said impedance device to the energy supply source including first and second impedances, second switch contacts connected in circuit with said first and second impedances to form a voltage divider having an output terminal, and a transformer including a primary winding connected to said first switch contacts, the source and the prime mover, and a secondary winding having a center tap connected to ground, said voltage divider connected across said secondary winding, and switching means for operating said first and second switch contacts in response to first and second impedance values exhibited by said impedance device to control gating of said solid state device and energization of the prime mover via said first switch contacts and the circuit completion of said voltage divider via said second switch contacts, said switching means including an amplifier coupled to said first and second switch contacts and including an input transistor connected to said output of said voltage divider and a diode poled to prevent the application of a reverse polarity to said input transistor.

References Cited

UNITED STATES PATENTS

| | | | |
|---|---|---|---|
| 3,252,420 | 5/1966 | Sorensen | 137—394 X |
| 3,266,167 | 8/1966 | Finnegan | 317—148.5 X |
| 3,298,191 | 1/1967 | Burke | 62—140 |
| 3,335,334 | 8/1967 | Albisser | 317—148.5 X |

ROBERT K. SCHAEFER, Primary Examiner

T. B. JOIKE, Assistant Examiner

U.S. Cl. X.R.

62—139; 137—393, 394